United States Patent [19]

Henss

[11] 4,207,768
[45] Jun. 17, 1980

[54] INDICATOR INSTRUMENT, PARTICULARLY FOR VEHICLES

[75] Inventor: Heinrich Henss, Kronberg, Fed. Rep. of Germany

[73] Assignee: VDO Adolf Schindling AG, Frankfurt am Main, Fed. Rep. of Germany

[21] Appl. No.: 942,971

[22] Filed: Sep. 18, 1978

[30] Foreign Application Priority Data

Sep. 19, 1977 [DE] Fed. Rep. of Germany ....... 2742111

[51] Int. Cl.$^2$ .......................................... G01D 11/24
[52] U.S. Cl. ........................................ 73/431; 73/493
[58] Field of Search ................. 73/431, 411, 416, 493, 73/756

[56] References Cited

U.S. PATENT DOCUMENTS

| | | | |
|---|---|---|---|
| 2,215,570 | 9/1940 | Sylvander | 73/431 |
| 2,262,920 | 11/1941 | Carbonara | 73/431 X |
| 2,285,658 | 6/1942 | Hitchcock | 73/431 UX |
| 2,346,495 | 4/1944 | Lingel | 73/431 X |
| 2,719,403 | 10/1955 | Gisiger | 73/431 X |
| 3,226,836 | 1/1966 | Bond | 73/431 X |
| 3,287,980 | 11/1966 | Gilliland | 73/431 X |
| 3,530,724 | 9/1970 | Harland et al. | 73/431 |
| 3,913,400 | 10/1975 | Floren | 73/431 X |
| 4,034,612 | 7/1977 | Buckwitz | 73/431 |
| 4,052,899 | 10/1977 | Longhetto | 73/431 X |

Primary Examiner—John Petrakes
Attorney, Agent, or Firm—Martin A. Farber

[57] ABSTRACT

Indicator instruments, particularly for vehicles, with a housing made of synthetic material, at least one indicator system which is fastened on a carrier connected with the housing, and a window shield which is secured to the housing and arranged in front of the indicator system or indicator systems, respectively. The housing is made of an elastic deformable synthetic material or plastic and has at least on two inner sides which are opposite one another two grooves which are arranged spaced from one another, in which grooves the indicator system carrier and the window shield are insertable.

13 Claims, 3 Drawing Figures

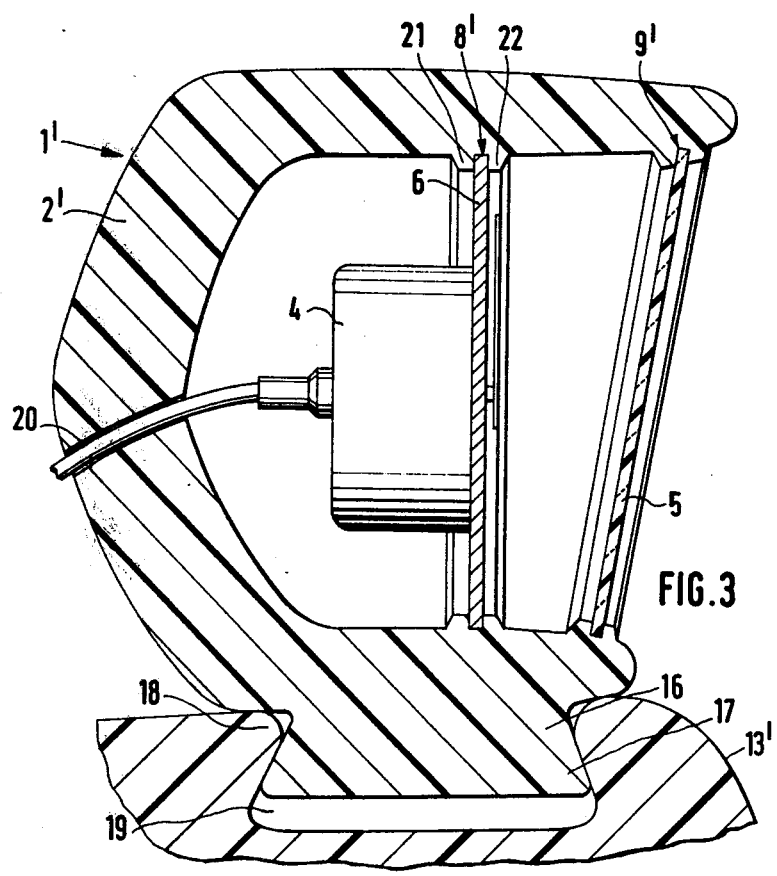

INDICATOR INSTRUMENT, PARTICULARLY FOR VEHICLES

The invention relates to indicator instruments, particularly for vehicles, with a housing made of synthetic material, at least one indicator system which is fastened on a carrier connected with the housing, and a window shield which is secured to the housing and arranged in front of the indicator system or indicator systems, respectively.

Known indicator instruments and particularly combination instruments of this type comprise a rigid plastic housing in which the indicator system or systems, respectively, are fastened, either on the rear wall or on a partition wall which is arranged between the rear side and the front side, by means of screws or catch means formed or attached on the wall. The front side of the housing is closed off with a window shield made of plastic, the latter being welded or glued with the housing, in order to insure that no dust and dirt can enter into the housing from the outside and that the readability of the indicator instrument cannot be impaired. For production of the housing of such indicator instruments, expensive die molds or injection molds are required, the shapes of which are more complicated the more fastening means for the indicator system are die-cast as well. Moreover for carrying out the assembly or mounting of the housing and the window shield, expensive welding or gluing devices are required. Disassembly which possibly becomes necessary after the assembling of the window shield because of manufacturing defects, furthermore, is not possible without the danger of damaging the housing.

These and other disadvantages of the known indicator instruments are to be overcome by the invention.

It is therefor an object of the present invention to make an indicator instrument which can be produced with the lowest possible cost.

Particularly, the housing should be able to be produced by means of simply constructed die or injection molds, and the individual construction parts of the indicator instrument (housing, window shield and indicator system) should be mountable and demountable, simply and quickly and easy to repair.

It is another object of the invention in accordance with the abovementioned object to provide an indicator instrument of the introductorymentioned type wherein the housing (e.g., 2, 2') is made of an elastic deformable synthetic material or plastic and has at least on two inner sides which are opposite one another two grooves (e.g., 8, 9; 8', 9') which are arranged spaced from one another, in which grooves the indicator system carrier (6) and the window shield (5) are snapped.

With such a housing the indicator system or systems, respectively, as well as the window shield can be inserted into the housing without the help of tools or working stock operating means, such as welding or gluing devices. The insertion as well as the removal of the indicator system or systems, respectively, and the window shield, as still to be shown, constitutes, an extremely simple working process, which can be carried out even by unskilled personnel. This is a particular advantage of the invention. A further advantage of the invention is that the housing has accident protection or prevention which is great compared to the known indicator instruments. Moreover the indicator system is protected better than the known indicator instruments against vibrations and impacts, which brings advantages to the durability and the indicator preciseness of the indicator systems. Finally by this housing there is achieved an improved damping of the noises produced by the indicator systems—for example of a clock or an eddy current tachometer which is driven by a flexible shaft.

According to one embodiment of the invention, each groove (8, 8', 9, 9') runs along the entire inner periphery of the housing. In this manner, on the one hand, a non-objectionable seating or mounting of the indicator system or systems, respectively, and of the window shield in the housing is achieved, and on the other hand, it is guaranteed that between the housing and the window shield no intermediate space is present through which dirt and dust particles could enter into the inside of the housing.

It has been proven practical to form each groove (8, 9) by a recessing (10) in the housing wall. In those cases in which by such grooves the wall strength or thickness of the housing would be impermissibly thin at the groove position with respect to the mechanical carrying capacity of the housing, it is recommended to form each groove (8', 9') by means of two stays or flanges (21, 22) which run parallel to one another.

According to an advantageous embodiment of the invention, the housing (2) is open on its rear side, formed such that the indicator system or systems, respectively, (3, 4) are able to be inserted and removed from the rear. The assembly of the indicator systems in the interior of the housing is considerably simplified in this manner. Likewise with electrical indicator systems, the connection lines may be applied more easily than would be the case with a closed rear side. Finally such a housing shape has advantages in production. If importance is placed on a particularly high screening-off of the inside of the housing against the intrusion or penetration of dirt and dust particles, it is recommended that the housing (2') be formed in the shape of a pot and in the range of its rear wall to provide a penetration opening (20) for the supply lines of the indicator systems (3, 4). If this penetration opening furthermore is chosen slightly smaller than the outer diameter of the cable stock or harness which is connected with the indicator systems, thus a particularly high sealing effect is obtained. With such a housing, the indicator systems and the window shield are inserted one after the other from the front into the housing.

With an indicator instrument with a housing which is able to be mounted on the instrument panel, according to a further concept of the invention, on the bottom side of the housing (2') there is formed or attached thereon a shoulder (16) with a bead or enlargement (17) for removeably connecting or joining of the housing (2') in a recess (19) of the instrument panel (13'). In this manner the housing can be removed from the instrument board for example for the exchange or replacement of a defective indicator system for an intact one quickly and without the releasing of screws, nuts or other securing elements. In this manner the ease of repairs of the indicator instrument is further improved. A particular advantage of this solution resides in that no additional fastening means are required for fastening or holding the indicator instrument fixed on the instrument panel and that the shoulder which serves for the fastening can be produced in the same working step in which the housing is also produced. This advantageously affects the production costs.

With an indicator instrument, with a housing that is able to be mounted in the instrument panel, the housing (2) advantageously possesses a peripheral bead or enlargement (14) on its outer surface, which bead engages in a corresponding recess (15) in the instrument panel (13). Such a shaped housing has the same advantages as the previously described housing provided for fastening onto the instrument panel.

According to an advantageous embodiment of the invention the housing (2, 2') is made of a soft elastic plastic foam. With such a material the previously described advantages and characteristics of the housing are able to be realized particularly well. The use of a polyurethane foam material or also a polyvinyl chloride foam material has proven suitable.

With the above and other objects and advantages in view, the present invention will become more clearly understood in connection with the detailed description of a preferred embodiment, when considered with the accompanying drawings, of which:

FIG. 3 is a cross-section through the indicator instrument of another embodiment construction.

Figure 1:
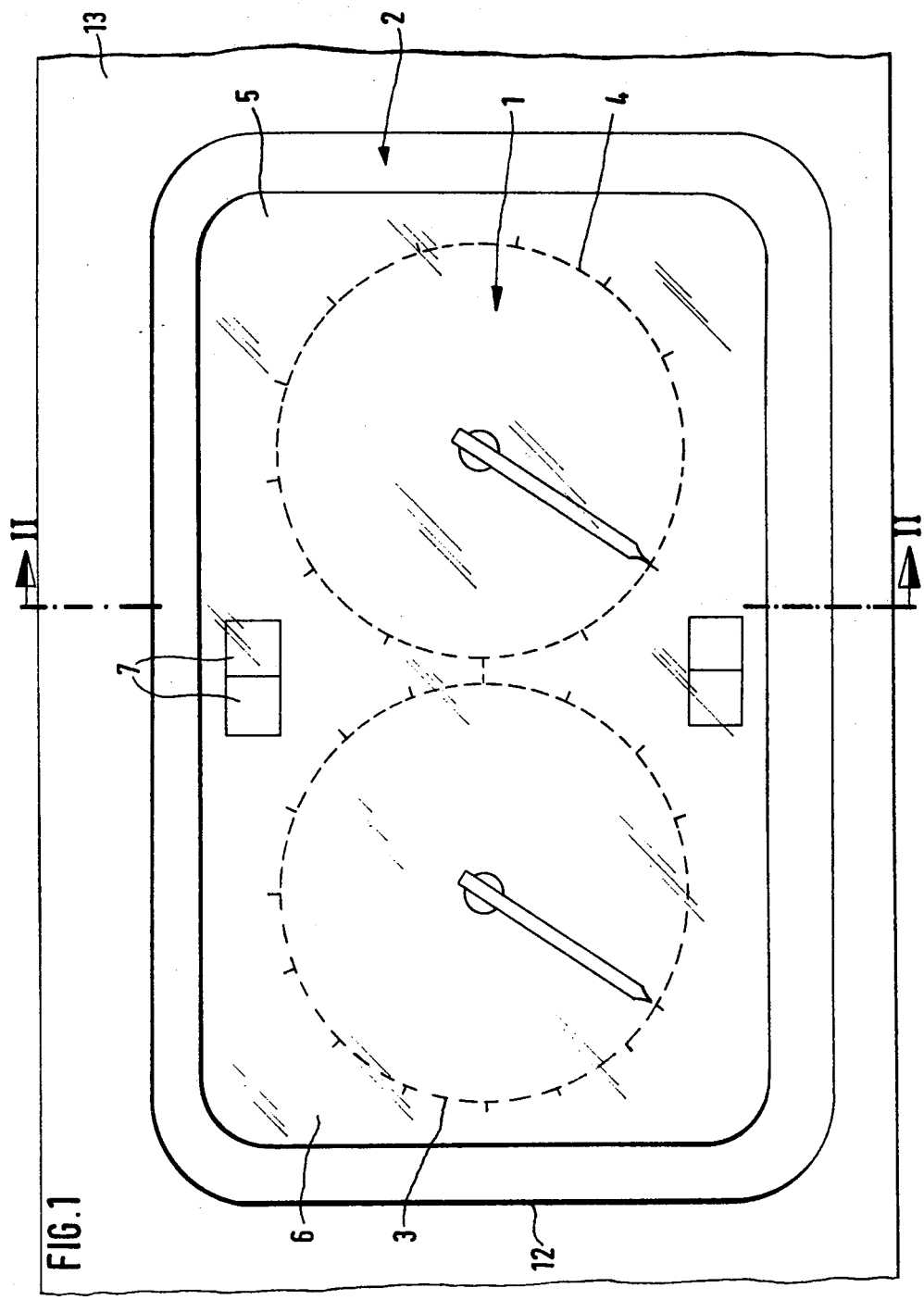
FIG. 1 is a front view of an indicator instrument in an instrument panel, the indicator instrument containing several indicator systems.
Figure 2:
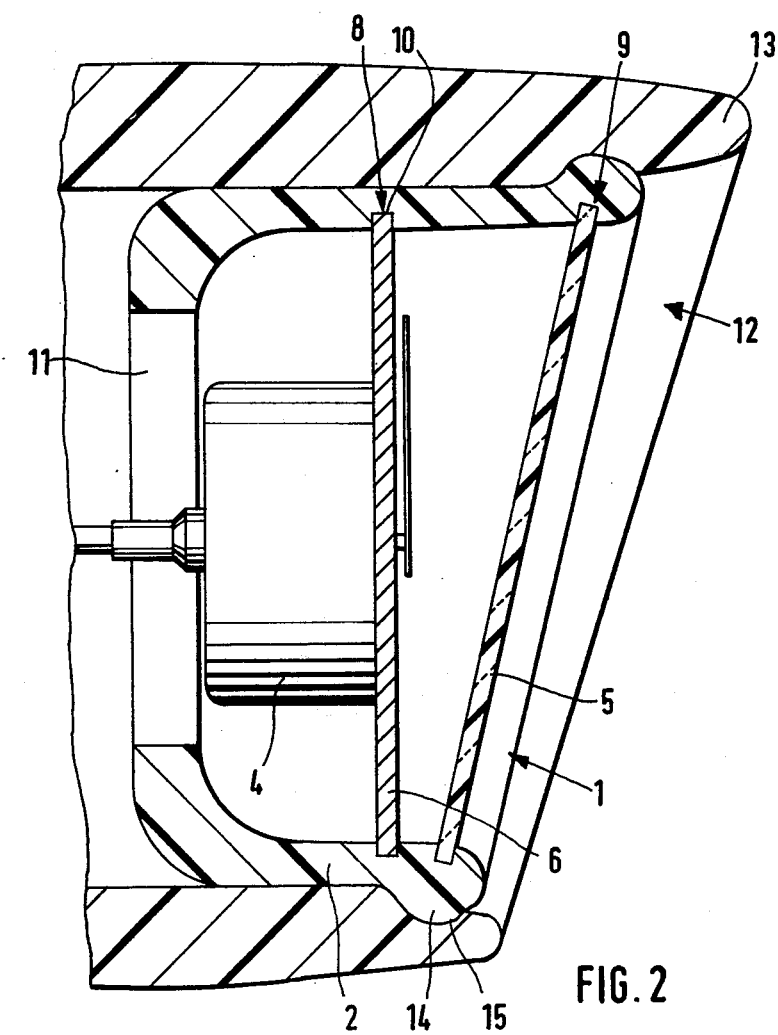
FIG. 2 is a cross-section through the indicator instrument according to FIG. 1 taken along the line II—II of FIG. 1.

Referring now to FIGS. 1 and 2 of the drawings, an indicator instrument 1 in accordance with the present invention comprises a housing 2 made of a soft elastic polyutherane foam material, two indicator systems 3 and 4 and a window shield or pane 5 which covers the system toward the front, which window shield is made of a glass-like clear plastic. The two indicator systems 3 and 4 are seated on a carrier plate 6 which is made of sheet metal or a hard elastic synthetic material, the carrier plate being associated with or coordinated to the indicator systems 3 and 4 in common. Warning or alarm lights 7 moveover are fastened in the carrier plate 6.

Two grooves 8 and 9 are formed on the inner side of the housing 2. The grooves 8 and 9 extend over the entire inner periphery of the housing. Each of the grooves 8 and 9 are formed by means of a recess 10 in the housing wall. The edges of the window shield 5 and the edges of the carrier plate 6 engage in these grooves 8 and 9.

An opening 11 is located in the rear side of the housing. The opening 11 extends approximately over the entire rear side of the housing. Through this opening 11 the carrier plate 6 with the indicator systems 3 and 4 can be inserted into the housing 2 from behind. Moreover, the connection cables and connection lines for the indicator systems 3 and 4 and the alarm lights 7 can lead out from the housing 2 through the opening 11.

After the snap insertion or mounting of the carrier plate 6 in the recess 8 through the rearward opening 11 and the subsequent snap mounting joining of the window shield 5 in the recess 9 which is associated with the window shield, by which mountings, respectively, the housing 2 is elastically deformed, the housing 2 is pushed in the therefor provided opening 12 in the instrument board 13 until the peripheral bead 14 (which is formed on the front side of the housing) engages or snaps in a recess 15 in the instrument panel 13, which recess 15 being coordinated or adjusted to the bead. In this position the housing 2 is held securely in the instrument panel 13 against an unintentional or inadvertent release or removal.

With the embodiment according to FIG. 3, the housing 2' of the indicator instrument 1' is formed as a pot-shaped housing which is set on top of the instrument panel. For securing or holding the housing 2' fixed on the instrument panel 13', a shoulder projection or abutment 16 with a bead 17 is formed on the bottom side of the housing 2'.

The shoulder engages or grips behind a corresponding edge 18 of a recess 19 of the instrument panel 13'. In the range of its rear wall, the housing 2' is provided with a penetration opening 20 for the supply lines of the indicator systems 3 and 4 and of the alarm lights 7. With this embodiment the grooves or recesses 8' and 9' are each formed by means of two flanges or stays 21 and 22 which extend parallel to one another. The assembly of the carrier plate 6 with the indicator systems 3 and 4 as well as that of the window shield 5 take place from the front.

While I have disclosed one embodiment of the invention it is to be understood that this embodiment is given by example only and not in a limiting sense.

What is claimed is:

1. An indicator instrument, particularly for motor vehicles, comprising
   a housing made of elastically deformable synthetic material,
   an indicator system carrier being connected with said housing,
   at least one indicator system fastened on said carrier,
   a window shield being fastened on said housing and arranged in front of said at least one indicator system,
   said housing defining opposite inner sides and being formed at least on two of said opposite inner sides with two grooves, said two grooves being arranged spaced apart from one another,
   said indicator system carrier and said window shield being snapped in said two grooves, respectively.

2. The indicator instrument according to claim 1, wherein
   each of said grooves extends over the entire inner periphery of said housing.

3. The indicator instrument according to claim 1 or 2, wherein
   said housing is formed with two stays each for each of said grooves, respectively, said two stays define one of said grooves, respectively, said two stays extend parallel to one another.

4. The indicator instrument according to claim 1 or claim 2, wherein
   each of said grooves is formed by a recess in a wall of said housing.

5. The indicator instrument according to claim 1, wherein
   said housing is formed open on a rear side thereof remote from said window shield, said at least one indicator system is adapted to be inserted and removed from the rear side of said housing.

6. The indicator instrument according to claim 1, wherein
   said housing has a rear wall and is formed in the shape of a pot,
   said housing at least in the vicinity of said rear wall is formed with a penetration opening adapted for supply lines of said at least one indicator system to pass therethrough.

7. An indicator instrument in cooperation with an instrument panel having a recess, particularly for motor vehicles, comprising
- a housing made of elastically deformable synthetic material,
- an indicator system carrier being connected with said housing,
- at least one indicator system fastened on said carrier,
- a window shield being fastened on said housing and arranged in front of said at least one indicator system,
- said housing defining opposite inner sides and being formed at least on two of said opposite inner sides with two grooves, said two grooves being arranged spaced apart from one another,
- said indicator system carrier and said window shield being insertable in said two grooves, respectively,
- said housing is adapted to be set onto said instrument panel,
- said housing includes a bottom side thereof formed with a shoulder with bead means for joining said housing in said recess of said instrument panel.

8. An indicator instrument in cooperation with an instrument panel having a recess, particularly for motor vehicles, comprising
- a housing made of elastically deformable synthetic material,
- an indicator system carrier being connected with said housing,
- at least one indicator system fastened on said carrier,
- a window shield being fastened on said housing and arranged in front of said at least one indicator system,
- said housing defining opposite inner sides and being formed at least on two of said opposite inner sides with two grooves, said two grooves being arranged spaced apart from one another,
- said indicator system carrier and said window shield being insertable in said two grooves, respectively,
- said housing is adapted to be mounted into said instrument panel,
- said housing has a peripheral bead on an outer surface thereof,
- said bead engages in said recess in said instrument panel.

9. The indicator instrument according to claim 1, wherein
said housing is made of a soft elastic foamed plastic.

10. The indicator instrument according to claim 9, wherein
said housing is made of polyurethane foam material.

11. The indicator instrument according to claim 9, wherein
said housing is made of a polyvinyl chloride foam material.

12. The indicator instrument according to claim 7, wherein
said bead means widens in a downward direction and has a dove-tail cross-section.

13. The indicator instrument according to claim 8, wherein
said peripheral bead extends completely around the entire outer periphery of said housing adjacent a front open end of said housing.

* * * * *